Sept. 25, 1962 A. C. BARR Re. 25,247

NURSING BOTTLE UNITS

Original Filed Aug. 3, 1960

Inventor
Arthur C. Barr

By McCanna, Morsbach & Pillote
Atty's

United States Patent Office

Re. 25,247
Reissued Sept. 25, 1962

25,247

NURSING BOTTLE UNITS

Arthur C. Barr, 111 King St., Madison, Wis.

Original No. 3,028,983, dated Apr. 10, 1962, Ser. No. 47,256, Aug. 3, 1960. Application for reissue May 9, 1962, Ser. No. 193,908
8 Claims. (Cl. 215—11)

Matter enclosed in heavy brackets [ ] appears in the original patent but forms no part of this reissue specification; matter printed in italics indicates the additions made by reissue.

This invention relates to nursing bottle units.

It is a general object of this invention to provide a nursing bottle unit which will enable reading of the amount of liquid remaining in the bottle when the bottle is in inverted position during feeding.

Another object of this invention is to provide a nursing bottle unit having graduations on the side of the bottle to indicate the amount of liquid remaining in the unit when the bottle is in an inverted position during feeding of the infant, and in which the nipple and the attachment of the nipple to the bottle is arranged to facilitate proper orientation of the bottle and the graduations thereon for reading of the liquid level when the nipple is in the infant's mouth.

A more particular object of this invention is to provide a nursing bottle unit in which the bottle has graduations on the side to indicate the amount of liquid remaining in the unit when the bottle is inverted during feeding of the infant, and in which the nipple has an oblong cross-section to assure a preselected orientation of the nipple in the infant's mouth and in which the cap is arranged to attach the nipple to the bottle with the major transverse axis of the nipple paralleling the planes defined by the graduations on the bottle so that the graduations on the bottle are properly oriented for reading of the liquid level when the nipple is in the infant's mouth.

These, together with various ancillary objects, and advantages of this invention will be more readily appreciated as the same becomes better understood by reference in connection with the accompanying drawings wherein.

During bottle feeding of an infant, the bottle is customarily held in an inverted position with its longitudinal axis inclined to a horizontal plane. From time to time during the feeding, it is desirable to check the amount of liquid which remains in the bottle to enable determination of the amount and rate at which the infant is consuming the liquid. It is, however, undesirable to periodically interrupt the infant's feeding to check the amount of liquid consumed since it is frequently difficult to make the infant resume feeding once he has stopped. In accordance with the present invention, the nursing unit is arranged so that the amount of liquid remaining in the bottle can be checked while the nipple is in the infant's mouth.

The bottle designated generally by the numeral 10 may be formed of any suitable transparent material such as glass, plastic or the like. In the embodiment shown, the bottle has a hexagonal cross-section defined by longitudinally extending side panels 10a–10f respectively which merge at one end with a frusto-conical end portion

Figure 1:
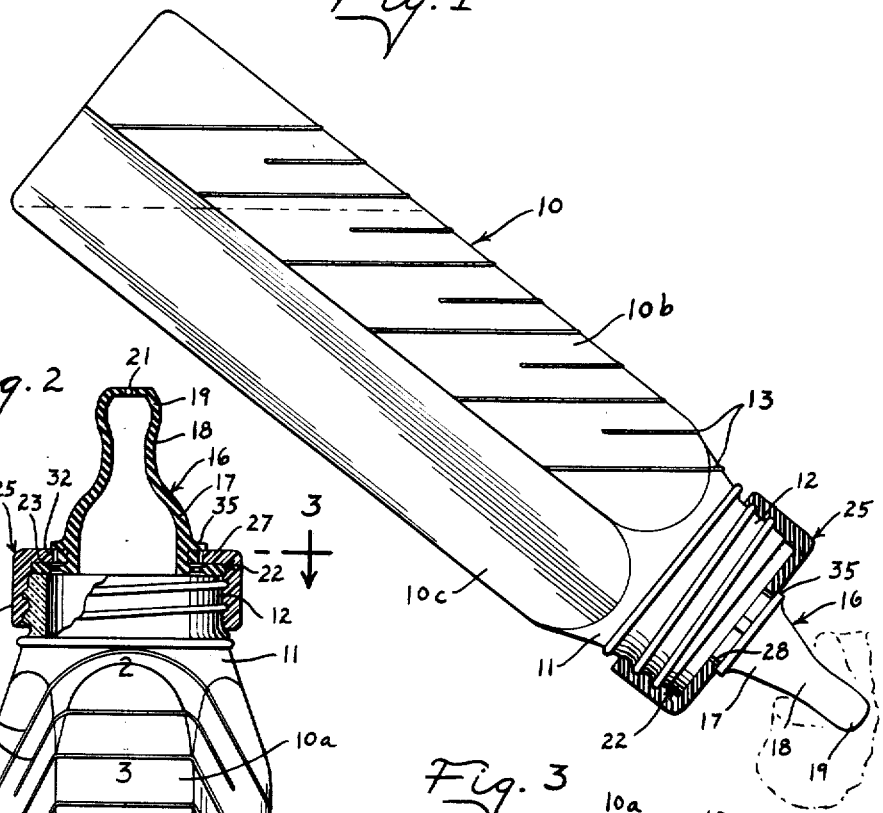
FIGURE 1 is a side elevational view of the nursing bottle unit illustrating the position of the same during feeding of an infant and with a part of the cap broken away and shown in section to illustrate details of construction.
Figure 2:
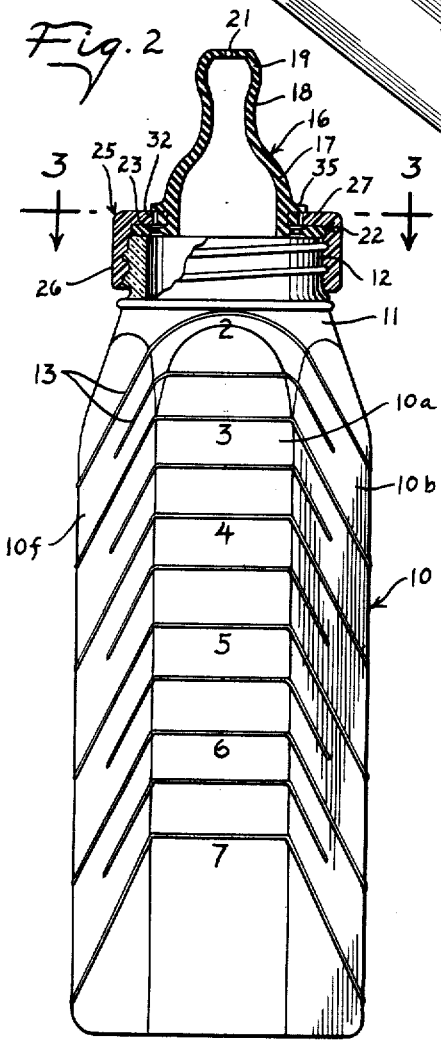
FIG. 2 is a side elevational view of the nursing bottle unit with part of the nipple and cap broken away and shown in section to illustrate details of construction.

11. An externally threaded neck 12 is provided at the end of the bottle and defines a mouth opening. During use of the bottle, the bottle is generally held in an inverted position with its longitudinal axis inclined to the horizontal, as shown in FIGURE 1 and graduations 13 are provided on the side of the bottle to enable reading of the liquid level when the bottle is in an inverted position. The graduations extend throughout a substantial portion of the circumference of the bottle sufficient so that each graduation defines a plane and, as shown, the graduations extend across the panel 10a and diagonally across the adjacent panels 10b and 10f. The graduations are arranged so that the planes defined thereby extend at an angle to the longitudinal axis of the bottle such that the planes defined thereby are substantially horizontal when the bottle is in its normal inverted position during feeding. In the form shown, the graduations extend at an angle of about 40° to the longitudinal axis of the bottle to thereby extend substantially horizontally when the axis of the bottle is inclined at an angle of about 40° to the horizontal. If, during feeding, the user holds the bottle at a slightly different angle, it is a simple matter to tilt the bottle slightly by an amount sufficient to make the liquid level in the bottle parallel with the planes defined by the graduations and thereby enable reading of the amount of liquid remaining in the bottle. The graduations are scaled in an inverted manner from the mouth end to the other end of the bottle as clearly shown in FIG. 2 to indicate the amount of liquid remaining in the bottle and nipple when the liquid level is at a particular graduation. Necessarily, the bottle should be transparent or sufficiently translucent to enable visual determination of the liquid level through the bottle.

Figure 3:
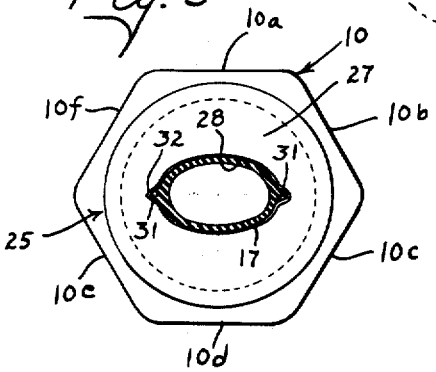
FIG. 3 is a transverse sectional view taken on the plane 3—3 of FIG. 2.

In order to use the graduations on the bottle to determine the liquid remaining in the bottle, it is necessary not only to support the bottle at the proper angle, but also to maintain the bottle in a preselected angular position with the graduations at the top. In order to facilitate positioning of the bottle and graduations in proper position to enable a determination of the liquid remaining in the bottle during feeding, the nipple is formed with an oblong cross-section such that when the nipple is inserted in the infant's mouth it will be oriented with its major transverse axis extending between the corners of the infant's mouth, and the nipple is, in turn, attached to the bottle in such a manner that the major transverse axis of the nipple extends parallel to the planes defined by the graduations. The nipple 16 includes an enlarged bulbous base portion 17, a reduced diameter neck 18 extending upwardly from the base portion and merging smoothly therewith, and a feeding tip 19 having a cross-section preferably larger than the neck portion. One or more feed holes 21 are provided in the feeding tip. A base flange 22 extends outwardly from the lower end of the base portion 17 and is arranged to overlie the end of the bottle opening. As shown, the base flange has a thickened peripheral rim portion which rests upon the end of the bottle and which rim portion is connected to the base of the nipple through a relatively flexible web section 23. The nipple has an oblong cross-section throughout at least a substantial portion of its length and, in the embodiment shown, the nipple has an oblong base portion 17. The feeding tip 19 is also preferably formed with an oblong cross-section for use by very small infants who generally take only the feeding tip into their mouth. By reason of the oblong cross-section, the nipple suggests insertion into the infant's mouth with the major transverse axis of the nipple extending between the corners of the mouth. A cap 25 is provided for attaching the nipple to the bottle and in such a manner that the major transverse axis of the nipple parallels the planes defined by the graduations 13. The cap has an internally threaded ring portion 26 which threadedly engages the end 12 of the bottle and an inwardly directed flange portion 27 which is adapted to overlie the flange 22 of the nipple and clamp the same to the end of the bottle. In accordance with the present invention, the flange 27 is formed with a non-circular opening 28 which non-rotatably receives the nipple in a preselected angular relation to the cap to assure proper orientation of the nipple relative to the cap. The threads on the cap and bottle are correlated with the thickness of the flange 22 on the nipple so that, when the cap is tightened on the bottle to firmly clamp the nipple flange to the bottle, the major transverse axis of the nipple will parallel the graduations. Keying of the nipple to the cap is preferably effected by means of a pair of opposed keys 31 which are formed on the base portion 17 of the nipple immediately above the nipple flange 22. The keys 31 extend into keyways 32 formed in the flange 27 of the cap to non-rotatably connect the nipple and cap. As shown in FIG. 3, the central opening 28 defined by the cap flange 27 is contoured complementary to the outer surface of the oblong base of the nipple to also aid in orienting the nipple relative to the cap. It is apparent that the configuration of the central opening 28 other than the keyways 32 could be circular, if desired. However, the oblong opening 28 suggests the proper angular relation between the nipple and cap when the user assembles the same and thus aids in locating the keys 31 in the notches 32. The nipple is also preferably formed with a retaining flange portion 35 which extends outwardly therefrom in generally parallel spaced relation to the base flange 22, as clearly shown in FIGS. 1 and 2. The retaining flange overlies the cap 25 around the central opening 28 therein to detachably retain the nipple on the cap.

From the foregoing it will be seen that the nipple has an oblong cross-section and suggests placement in the infant's mouth with its major transverse axis extending between the corners of the infant's mouth. Moreover, the cap has a non-circular opening in the flange to assure positioning of the major transverse axis of the nipple in a preselected position on the cap and the threads on the cap and bottle are arranged so that the major transverse axis of the nipple parallels the planes defined by the graduations on the bottle when the cap is tightened on the bottle. The nipple can be properly inserted in the infant's mouth in only two different positions 180° from each other. Thus, when inserting the nipple in the infant's mouth, it is only necessary to take care to select that angular position in which the graduations are at the upper side of the bottle. When the nipple is in the infant's mouth it will be maintained in the proper angular position and at substantially the proper angle for reading of the liquid level. If desired, an additional set of graduations similar to the graduations 13 can be provided at the underside of the bottle to enable reading of the liquid level when the nipple is inserted in the infant's mouth in either of the two possible positions thereof.

I claim:

1. A nursing bottle unit comprising a bottle having a mouth opening at one end, graduations on the side of said bottle having at least a portion inclined to the longitudinal axis of the bottle and defining relatively parallel planes inclined to the longitudinal axis of the bottle to extend substantially horizontally when the bottle is held in an inverted position with its axis inclined to a horizontal plane, a nipple having an oblong cross-section along at least a substantial portion of its length with its major transverse axis adapted to extend between the corners of an infant's mouth, and means attaching the nipple to the bottle with the major transverse axis of the nipple paralleling the planes defined by the graduations on the bottle.

2. A nursing bottle unit comprising a bottle having a mouth opening at one end, graduations on said bottle having at least a portion inclined to the longitudinal axis of the bottle and defining planes inclined to the longitudinal axis of the bottle and adapted to extend horizontally when the bottle is held in an inverted position with its axis inclined at a preselected angle to a horizontal plane, a nipple having an oblong cross-section along at least a substantial portion of its length with its major transverse axis adapted to extend between the corners of an infant's mouth; a cap for attaching the nipple [ot] *to* the mouth of the bottle, said cap and nipple having means non-rotatably connecting the nipple to the cap, and said bottle and cap having interengaging threads thereon so arranged *and related to the means non-rotatably connecting the nipple to the cap* that the major transverse axis of the nipple extends substantially parallel to the planes defined by said graduations when the cap is tightened on the bottle to secure the nipple thereto.

3. A nursing bottle unit comprising a bottle having a mouth opening at one end, graduations on said bottle having at least a portion inclined to the longitudinal axis of the bottle and defining planes inclined to the longitudinal axis of the bottle and adapted to extend horizontally when the bottle is held in an inverted position with its axis inclined at a preselected angle to a horizontal plane, a nipple having an oblong cross-section along at least a substantial portion of its length with its major transverse axis adapted to extend between the corners of an infant's mouth, said nipple having a base flange extending outwardly therefrom and adapted to overlie the mouth end of the bottle, a cap having an internally threaded ring portion and an inwardly extending flange portion, means on said flange portion engageable with said nipple for detachably locking the nipple to the flange portion on the cap in a preselected angular position relative thereto, said bottle having threads thereon adapted to engage the threads on the cap and so arranged *and related to the locking means on the cap flange and to the thickness of the nipple flange* that the major transverse axis of the nipple extends substantially parallel to the planes defined by graduations when the ring portion of the cap is tightened on the bottle to firmly clamp the nipple flange thereto.

4. A nursing bottle unit comprising a bottle having an externally threaded end defining a mouth opening, graduations on said bottle having at least a portion inclined to the longitudinal axis of the bottle and defining planes inclined to the longitudinal axis of the bottle and adapted to extend horizontally when the bottle is held in an inverted position with its axis inclined at a preselected angle to a horizontal plane, a [nipple] *cap* having an internally threaded ring portion adapted to engage the threads on the bottle and an inwardly extending flange portion, a nipple having an oblong cross-section along at least a substantial portion of its length with its major transverse axis adapted to extend between the corners of an infant's mouth, said nipple having an outwardly extending base flange adapted to underlie the flange portion on the cap and overlie the mouth opening of the bottle, said nipple having a non-circular cross-section in the portion surrounded by the flange portion on the cap and said flange portion on the cap having a non-circular opening therein non-rotatably receiving said non-circular portion of the nipple to orient the major transverse axis of the nipple in a preselected angular position relative to the cap, and the threads on said cap and bottle being so arranged *and related to the non-circular opening in the flange portion of the cap and the thickness of the nipple flange* that the major transverse axis of the nipple extends substantially parallel to the planes defined by said graduations when the ring portion of the cap is tightened on the bottle to firmly clamp the nipple flange thereto.

5. A nursing bottle unit comprising a bottle having an externally threaded end defining a mouth opening, graduations on said bottle having at least a portion inclined to the longitudinal axis of the bottle and defining planes inclined to the longitudinal axis of the bottle and adapted to extend horizontally when the bottle is held in an inverted position with its axis inclined at a preselected angle to a horizontal plane, a [nipple] *cap* having an internally threaded ring portion adapted to engage the threads on the bottle and an inwardly extending flange portion, a nipple having an oblong cross-section along at least a substantial portion of its length with its major transverse axis adapted to extend between the corners of an infant's mouth, said nipple having an outwardly extending base flange adapted to underlie the flange portion on the cap and overlie the mouth opening of the bottle, said nipple having outwardly extending keys thereon aligned with the major transverse axis thereof, said flange portion of said cap defining a central opening having opposed notches therein adapted to receive said keys on the nipple to non-rotatably secure the nipple to the cap with the major transverse axis of the nipple oriented in a preselected angular position on the cap, and the threads on the cap and bottle being so arranged *and related to the notches in the flange portion of the cap and to the thickness of the nipple flange* that the major transverse axis of the nipple extends substantially parallel to the planes defined by the graduations on the bottle when the ring portion of the cap is tightened on the bottle to firmly clamp the nipple flange thereto.

6. The combination of claim 5 wherein said nipple has an outwardly extending retaining flange paralleling said base flange and adapted to overlie the base flange on the cap to releasably retain the nipple on the cap, said retaining flange on the nipple extending crosswise of said keys.

7. A nursing bottle unit comprising a bottle having an externally threaded end defining a mouth opening, graduations on said bottle having at least a portion inclined to the longitudinal axis of the bottle and defining planes inclined to the longitudinal axis of said bottle and adapted to extend horizontally when the bottle is held in an inverted position with its axis inclined at a preselected angle to a horizontal plane, a nipple having a base portion and a feeding tip and a base flange extending outwardly from the base portion to overlie the mouth opening of the bottle, said base portion having an oblong external configuration with its major transverse axis adapted to extend between the corners of an infant's mouth, a cap having an internally threaded ring portion adapted for threaded engagement with the bottle and a flange portion adapted to overlie the base flange on the nipple, said flange portion defining a non-circular opening for non-rotatably receiving said oblong base portion of the nipple, the threads on the ring portion of the cap and the threads on the bottle being so arranged *and related to the non-circular opening in the flange portion of the cap and to the thickness of the base flange of the nipple* as to position the major transverse axis of the nipple substantially parallel to the planes defined by said graduations when the cap is threaded on the bottle and firmly clamps the base flange of the nipple to the bottle.

*8. A nursing bottle unit comprising a bottle having an externally threaded end defining a mouth opening, graduations on said bottle having at least a portion inclined to the longitudinal axis of the bottle defining planes inclined to the longitudinal axis of said bottle and adapted to extend horizontally when the bottle is held in an inverted position with its axis inclined at a preselected angle to a horizontal plane, a nipple having a base portion and a feeding tip and a base flange extending outwardly from adjacent the end of the base portion to overlie the mouth opening of the bottle, said base portion having an oblong external configuration with its major transverse axis adapted to extend between the corners of an infant's mouth, a cap having an internally threaded ring portion adapted for threaded engagement with the bottle and a flange portion adapted to overlie the base flange on the nipple, said flange portion defining an oblong opening through which the base portion of the nipple is adapted to be inserted when the major transverse axis of the base portion is aligned with the major transverse axis of said oblong opening, the threads on the ring portion of the cap and the threads on the bottle being so arranged and related to said oblong opening in the flange portion of the cap and to the thickness of said base flange on the nipple as to position the major transverse axis of the nipple substantially parallel to the planes defined by said graduations when the cap is threaded on the bottle and firmly clamps the base flange on the nipple to the bottle.*

References Cited in the file of this patent or the original patent

UNITED STATES PATENTS

| | | |
|---|---|---|
| D. 167,914 | Taranton | Oct. 7, 1952 |
| 2,514,744 | Cipak | July 1, 1950 |
| 2,954,030 | Jozwiak | Sept. 27, 1960 |